INVENTOR.
NOEL J. POUX

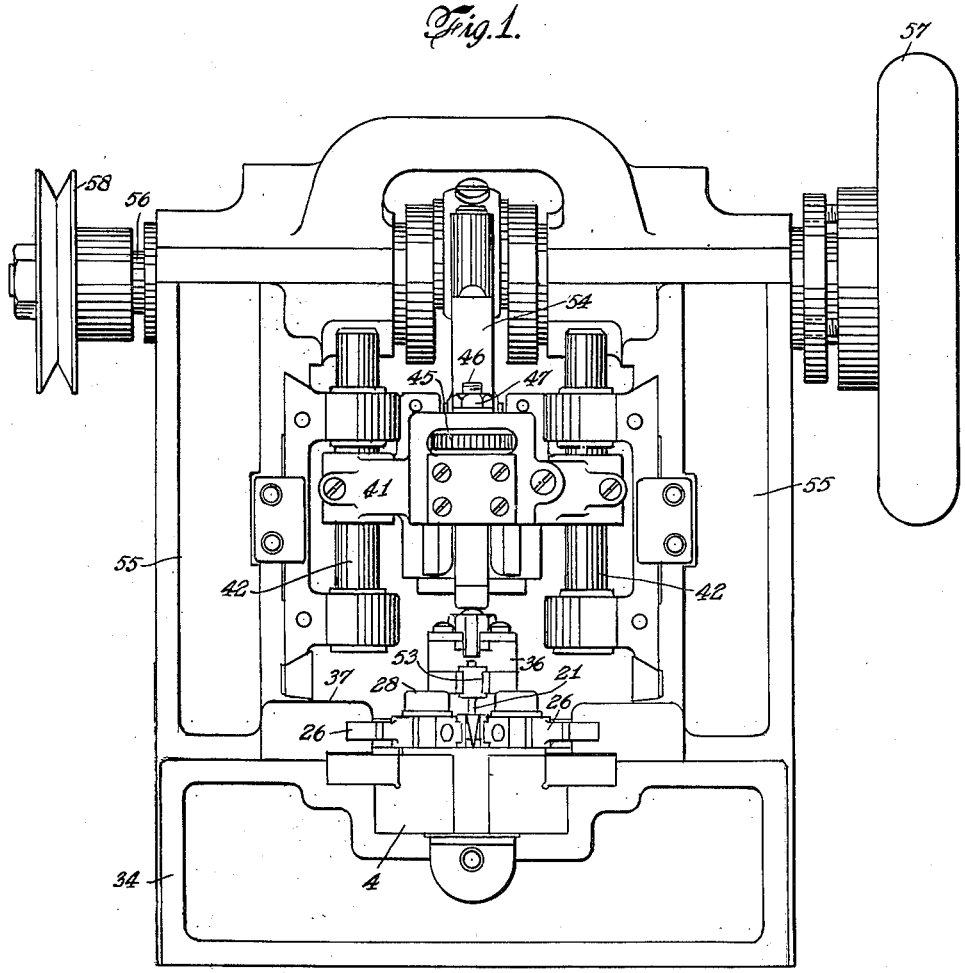

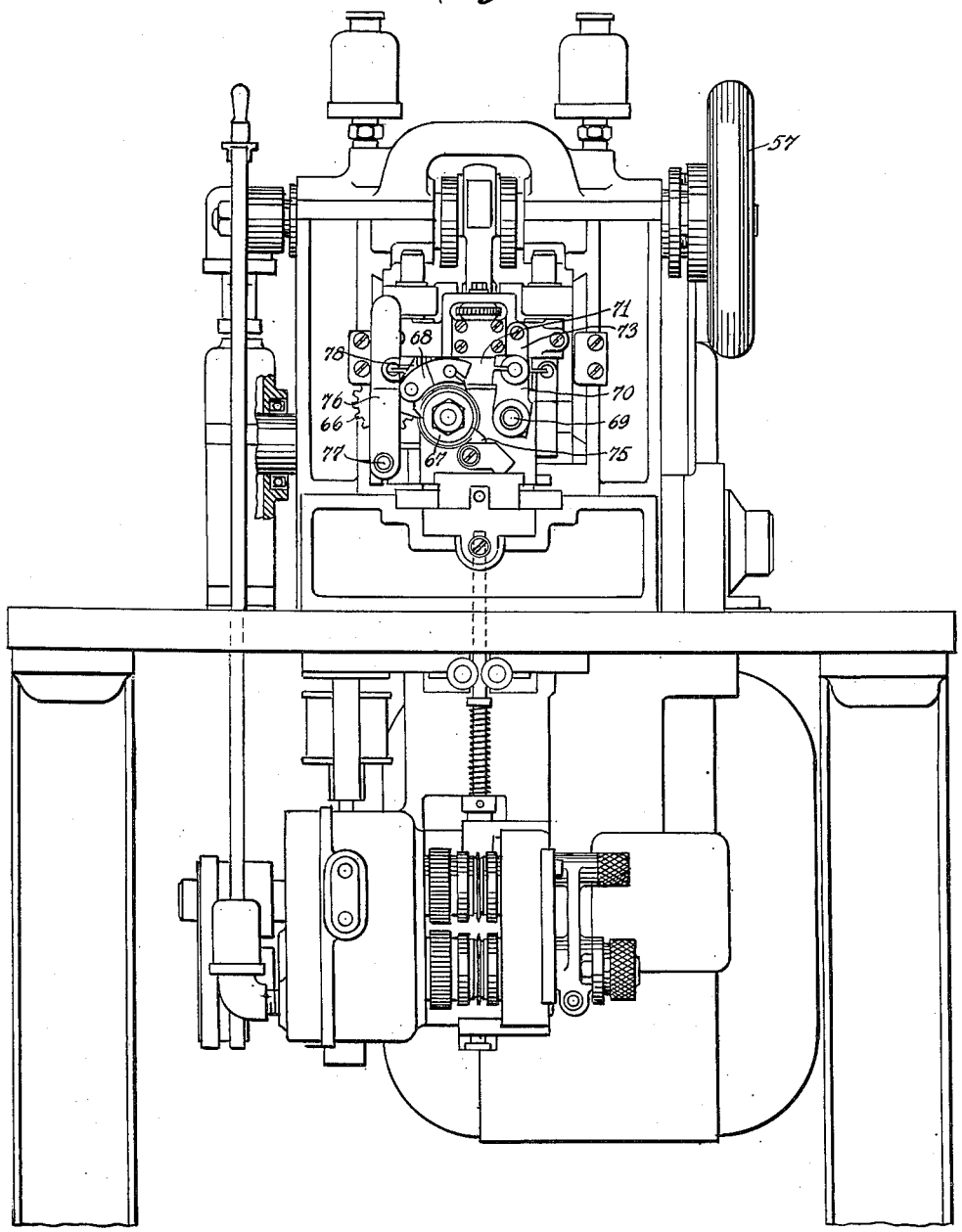

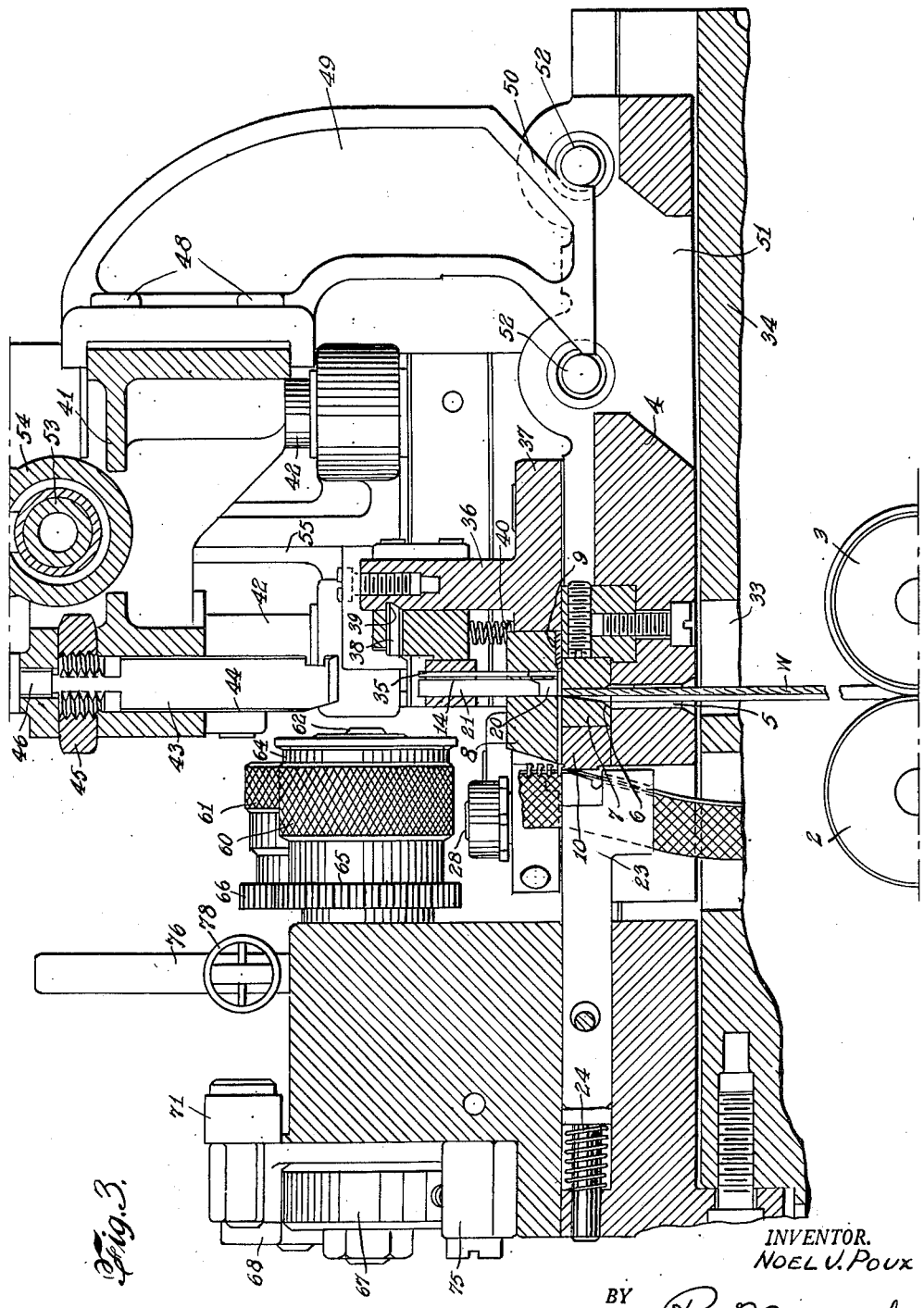

Sept. 3, 1957 N. J. POUX 2,804,677
MACHINE FOR MAKING SLIDE FASTENER STRINGERS
Filed Nov. 17, 1950 12 Sheets-Sheet 5

INVENTOR.
NOEL J. POUX
BY
R. E. Meech
ATTORNEY

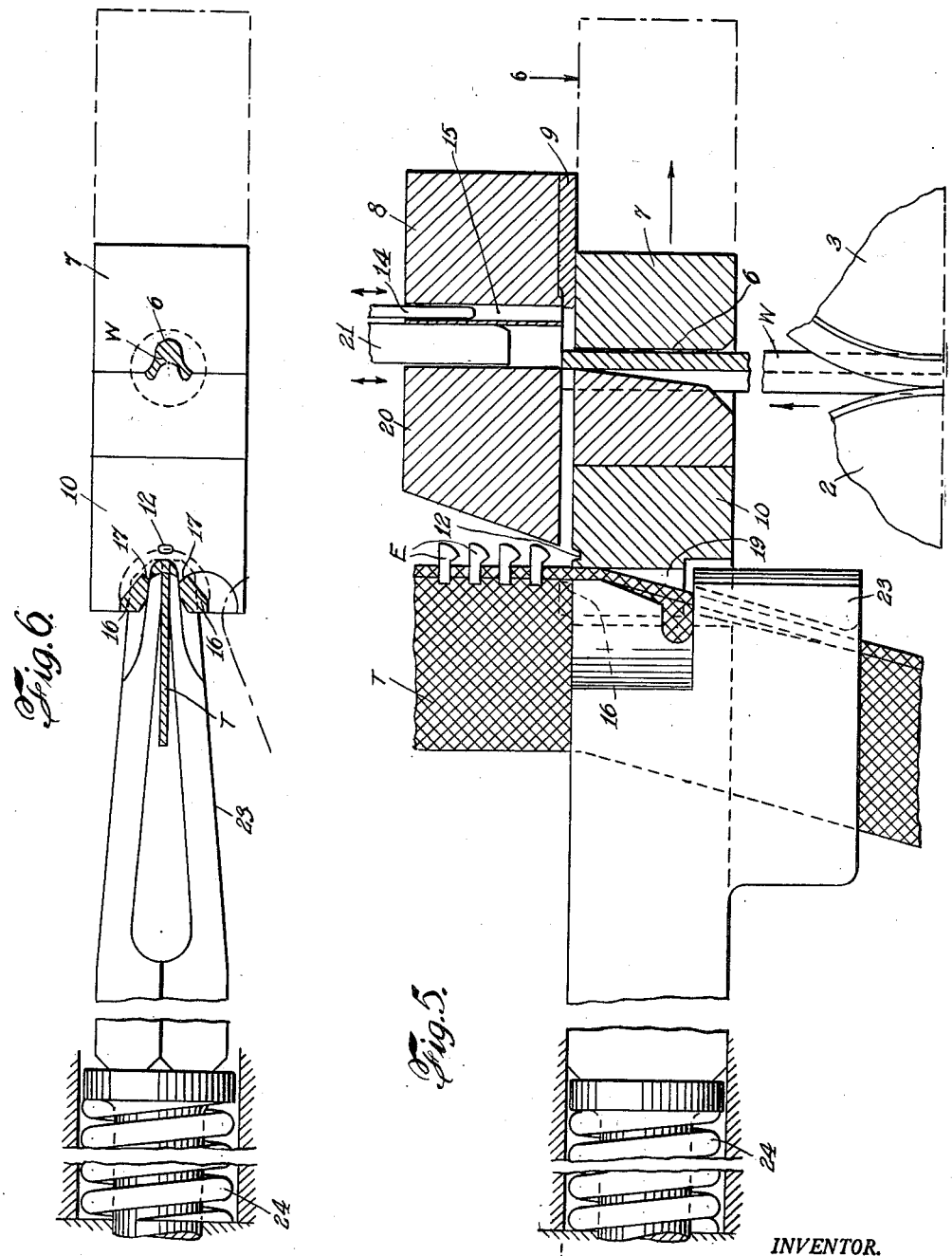

Sept. 3, 1957  N. J. POUX  2,804,677
MACHINE FOR MAKING SLIDE FASTENER STRINGERS
Filed Nov. 17, 1950  12 Sheets-Sheet 7
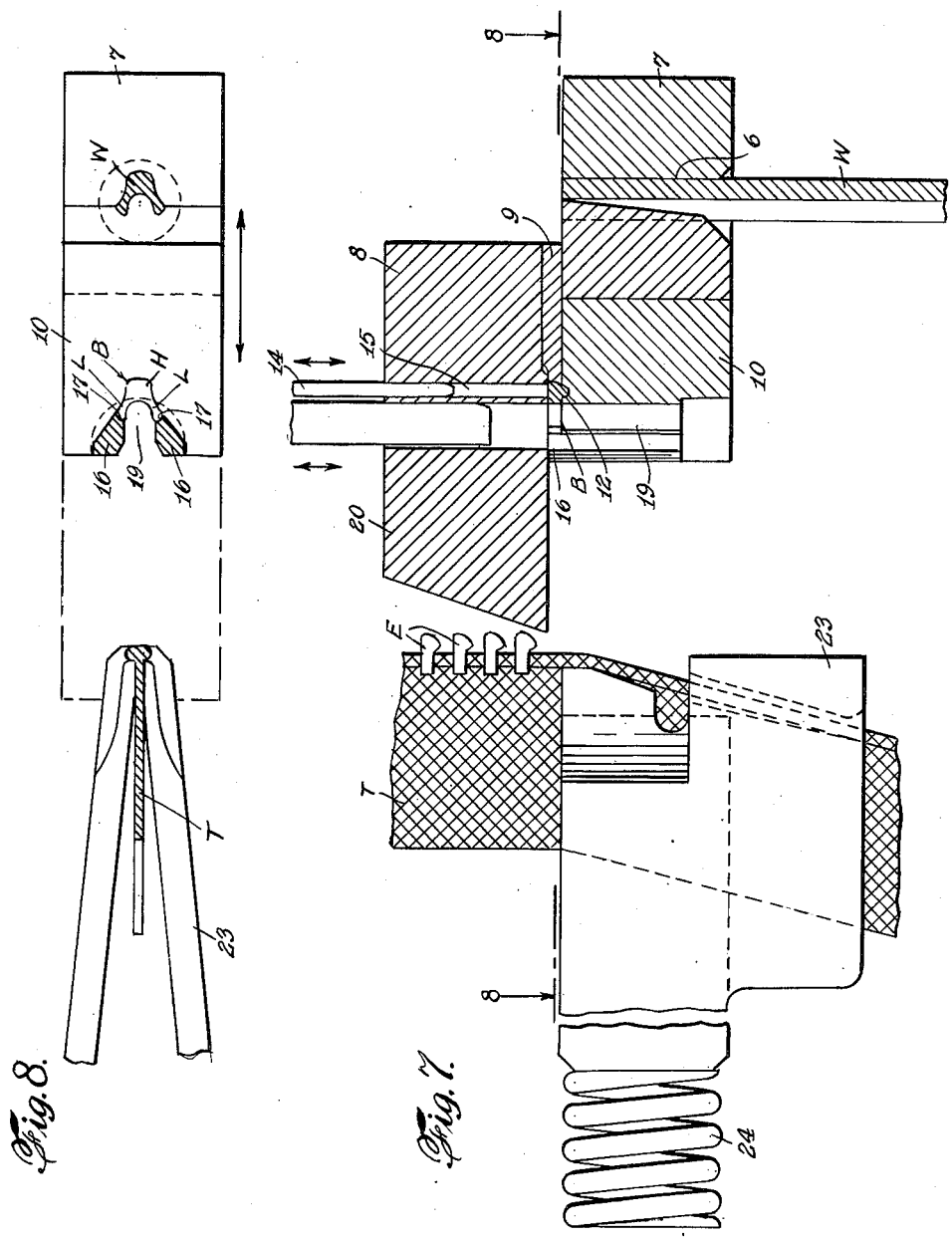
INVENTOR.
NOEL J. POUX
BY
R. E. Meech
ATTORNEY

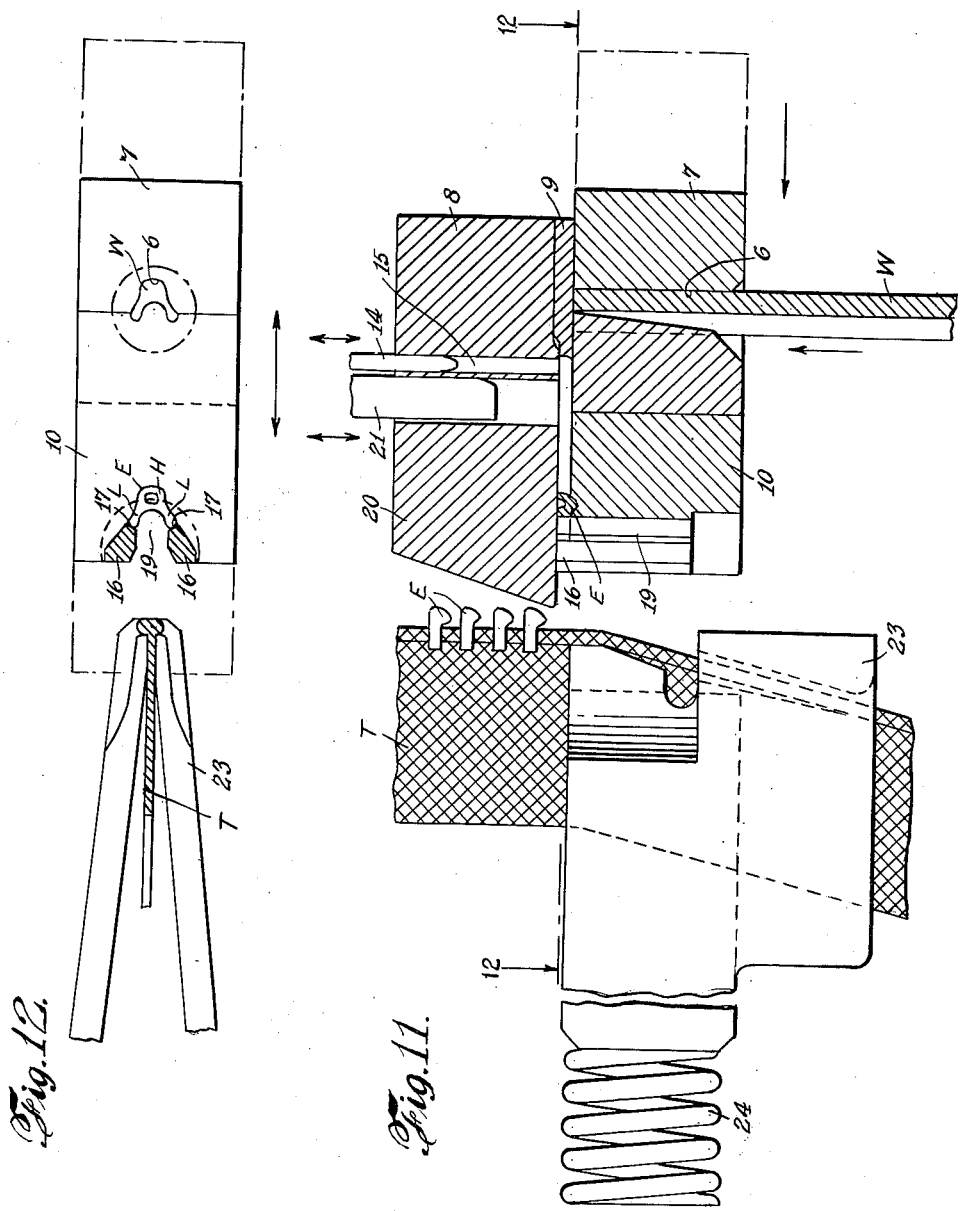

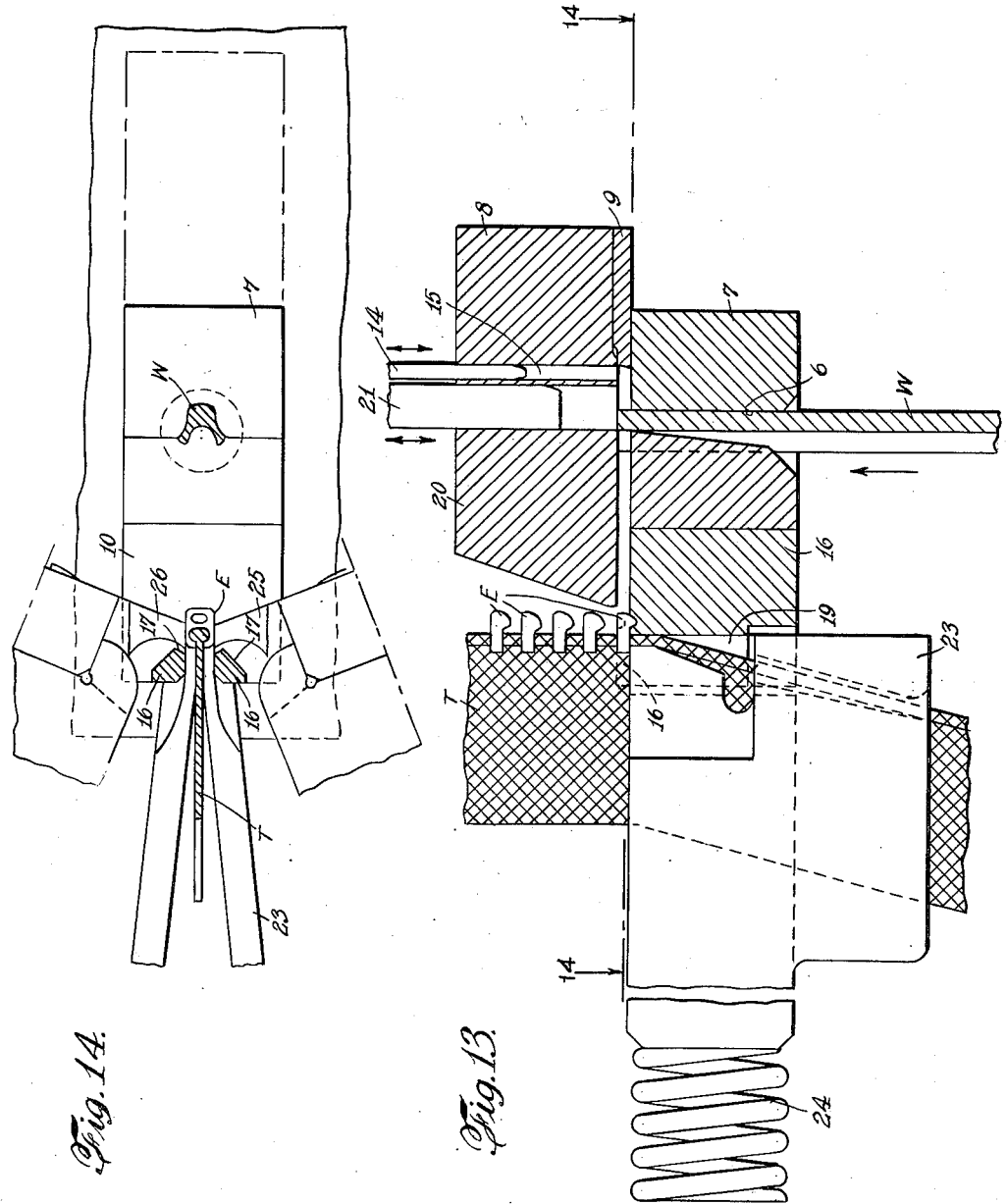

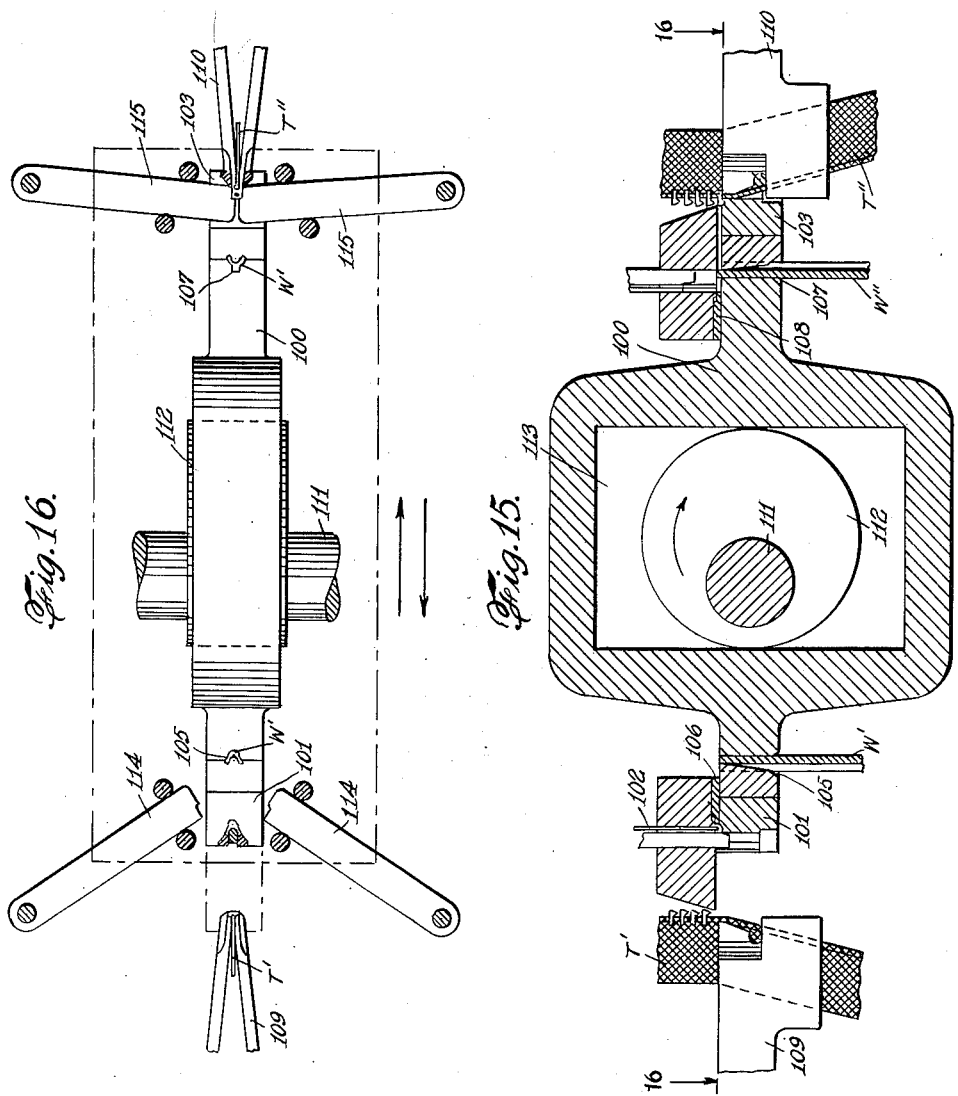

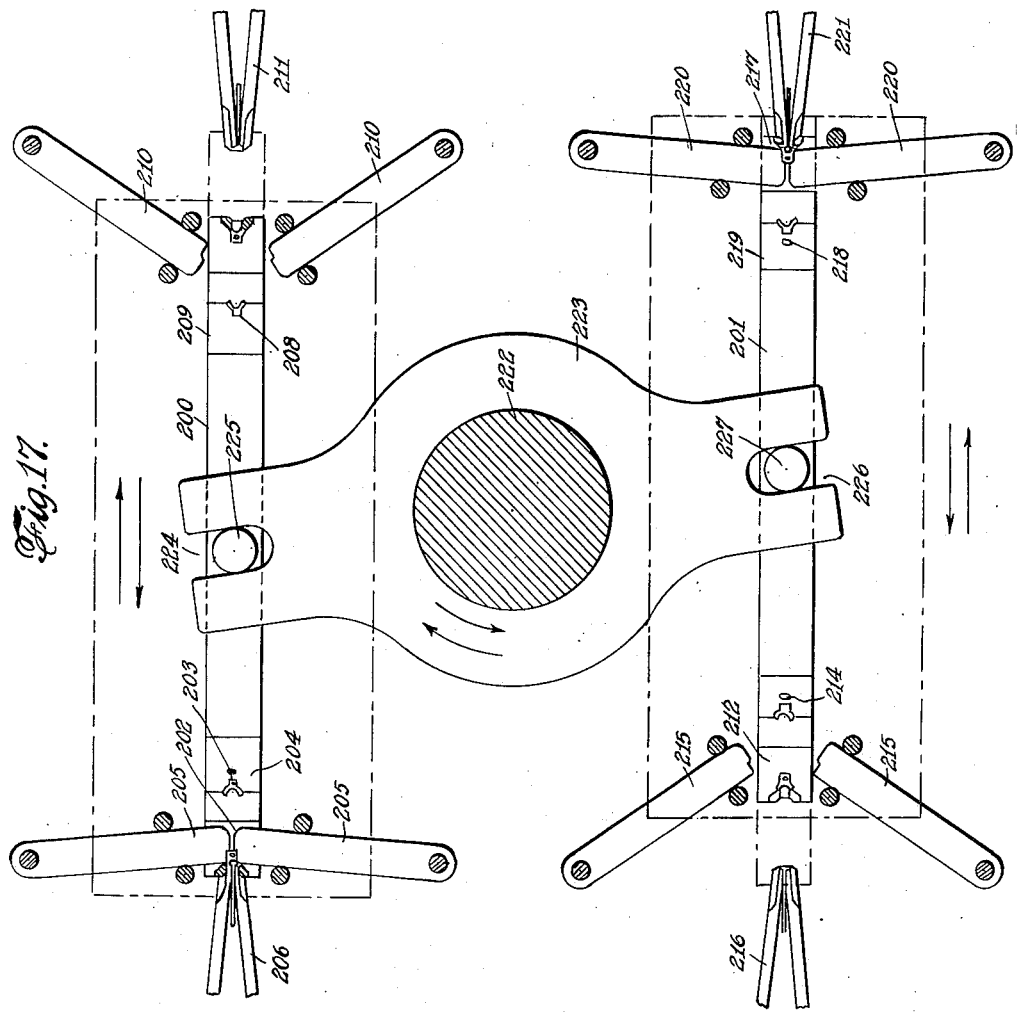

United States Patent Office 2,804,677
Patented Sept. 3, 1957

2,804,677

MACHINE FOR MAKING SLIDE FASTENER STRINGERS

Noel J. Poux, Meadville, Pa., assignor to Talon, Inc., a corporation of Pennsylvania Application November 17, 1950, Serial No. 196,113

4 Claims. (Cl. 29—34)

This invention relates to slide fasteners, and particularly to an improved machine for manufacturing slide fastener stringers.

In the manufacture of slide fastener stringers, it is important to form and apply at a relatively low cost a large number of small, accurately formed fastener elements on the edge of a tape stringer in accurately spaced relation. Various machines and methods for manufacturing stringers have been heretofore suggested and used but they have not been entirely satisfactory. One of the better known methods is to punch the elements from flat or preformed metal stock but such method involves a waste of stock, a high cost in the maintenance of tools and dies, and numerous other disadvantages.

In another method, the fastener elements are cut or sliced from the end of metal stock which has been previously formed, usually by rolling to substantially a Y-shaped cross section so as to conform substantially to the shape of the elements, and it is to a machine for practicing this latter method that the present invention relates. Such a method produces generally a better and smoother fastener than any other known method, and is known as a "scrapless" method in that there is no waste of material.

By this latter method, it is necessary to cut or slice the fastener element blanks from the end of the strip of metal stock at one point, forming an interlocking projection and recess in the head of the blanks at another point, and delivering and attaching the formed elements to a stringer tape at still another point so as to provide a completed fastener stringer. It is desirable that a simple and efficient machine be provided for practicing such a method, and a machine that requires a minimum amount of supervision and maintenance, and one that will operate at long intervals of time without the necessity of shutting it down.

According, it is the general object of the present invention to provide an improved machine for manufacturing slide fastener stringers which is inexpensive and simple in its operation and construction, and, at the same time, efficient and effective in its use and operation.

In forming the interlocking projections and recesses on fastener element blanks by methods heretofore known, it was difficult and practically impossible to obtain a uniform fastener element due primarily to the flow of the metal during the die forming operation. In other words, the dies did not confine the flow of the metal of the blank which oftentimes resulted in having one leg of the element longer than the other, or other variations. In the present invention, there is provided means substantially surrounding the fastener element blank so as to rigidly support and confine the metal during the die-forming of the elements, thereby providing uniform and accurate fastener elements, which is one of the most importat aspects of the present invention.

Another feature of my invention is an improved means for transferring the formed fastener elements from a forming station where the interlocking projections and recesses are formed therein to an attaching station where they are attached or clamped to the stringer tape or other carrier. By such means, the fastener elements are maintained under positive control at all times.

Accordingly, it is another object of the invention to provide a stringer manufacturing machine in which the fastener elements are securely and positively held from the time they are cut from the strip of metal stock until they are attached to the stringer tape.

It is a further object of this invention to provide a machine for making slide fastener stringers which requires no particular mechanical skill to operate or for replacement of parts, and a machine which needs no adjustments after it has once been set up for operation.

The present invention embodies means for cutting fastener element blanks preferably by slicing them from the end of a strip of wire stock which has been previously rolled to substantially a Y-shaped cross section. The machine in its preferred form includes a single forming die, and the fastener element blanks are transferred by the slicing means to the forming die. The forming die and the end of the wire strip are carried by a reciprocable slide with the end of the strip being moved against a stationary knife which cuts or slices a blank from the end of the strip and positions it in the die all during the movement of the slide to its retracted position in a direction away from the tape.

It is still another object of this invention to provide means in such a machine for securely holding the element during the attaching operation so as to eliminate angular or uneven positioning of an element on the edge of the tape due to uneven clamping pressure of the legs of the element or the bending of one leg to clamping position around the tape to a greater degree than the other leg.

It is still a further object of the present invention to provide means for clamping the legs of the fastener elements to the stringer tape which are actuated by the movement of the above mentioned reciprocable slide whereby the legs of the elements are bent uniformly and securely around the edge of the tape.

Various other objects and advantages of this invention will be more apparent in the course of the following specification, and will be particularly pointed out in the appended claims.

In the accompanying drawings, there is shown for the purpose of illustration, an embodiment and several modifications thereof which my invention may assume in practice.

In these drawings:

Fig. 1 is a front elevational view of the improved machine of the present invention with the wire and tape feeding means removed so as to disclose other parts of the mechanism;

Fig. 2 is a front elevational view, similar to Fig. 1, showing the complete machine;

Fig. 3 is a vertical cross section through the principal working parts of the machine;

Fig. 5 illustrates in vertical section the initial position of the slide, the forming punch and associated parts;

Fig. 6 is a sectional view taken on line 6—6 of Fig. 5;

Fig. 7 illustrates in vertical section another position the slide, the forming punch and associated parts assume in forming the fastener elements;

Fig. 8 is a sectional view taken on line 8—8 of Fig. 7;

Fig. 11 illustrates in vertical section still another position the slide and associated parts assume in transferring the formed fastener element from the forming station to the attaching station;

Fig. 12 is a sectional view taken on line 12—12 of Fig. 11;

Fig. 13 illustrates in vertical section the final position the slide and associated parts assume when the fastener elements are being attached to the tape at the attaching station;

Fig. 14 is a sectional view taken on line 14—14 of Fig. 13;

Fig. 15 is a vertical section illustrating a modified form of the machine of my invention;

Fig. 16 is a sectional view taken on line 16—16 of the modification shown in Fig. 15; and Fig. 17 is a schematic view illustrating another modification of my invention.

Figure 1A:
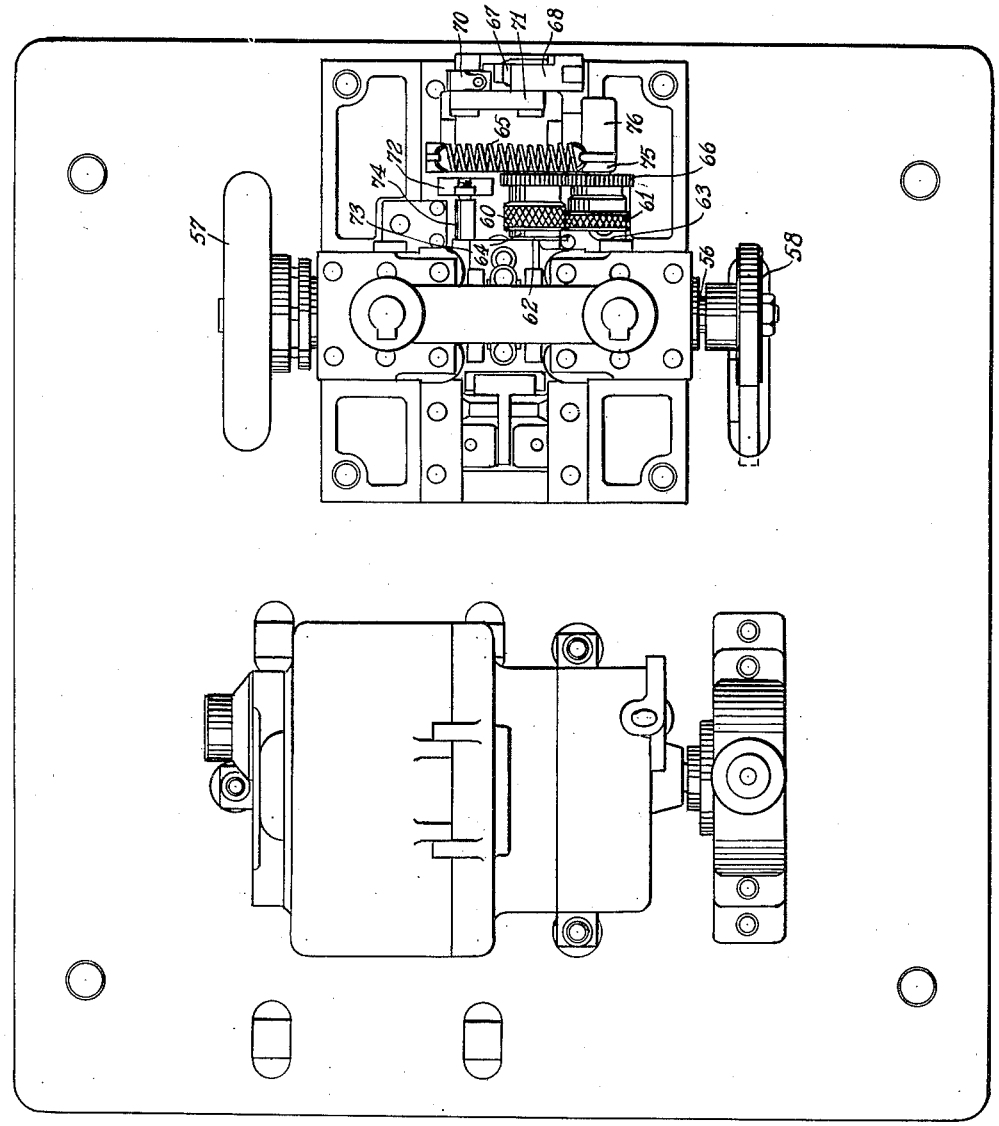
Fig. 1a is a plan view of the machine.

Referring more particularly to the drawings, the fastener elements E are formed from a continuous strip of wire W substantially Y-shaped in cross section which is fed upwardly into the machine, preferably by a pair of suitable friction rollers 2 and 3 driven by any suitable means. The wire W is preferably shaped by a previous cold rolling operation so as to have substantially the cross sectional shape of the finished fastener elements which is substantially Y-shaped.

As more clearly shown in Fig. 3 of the drawings, there is provided a reciprocable slide 4 having a vertically extending opening 5 therein into and through which the wire W is fed into and through an opening 6 arranged in a cutting die or knife block 7 having a cutting edge 7a mounted on the slide 4. The upper end of the wire W is adapted to abut the under side of a guide and stop block 8 positioned above the slide 4. The under side of the block 8 is spaced from the upper surface of the knife block 7 at a distance substantially equal to the thickness of a fastener element blank B so that the length of wire extending above the block 7 when abutting the bottom of the block 8 is substantially equal to the thickness of an element blank. The upper end portion of the wire stock W is adapted to move with the slide 4 and a stationary knife 9 is arranged on the under side of the block 8 in the space between the blocks 7 and 8 in the path of the extreme end of the wire stock W. When the slide 4 is moved toward its retracted position or to the right, as shown in Figs. 5 through 7, the extreme end of the wire W is moved into engagement with the knife 9, and this knife cuts or slices a piece from the end of the wire so as to provide a Y-shaped blank B having a thickness substantially equal to that of a finished fastener element.

When the slide 4 has reached its fully retracted position, it will be seen that the movement of the severed blank B has been arrested by the knife 9 and the blank is positioned in a forming die 10 mounted on the slide 4 forwardly of the block 7 so as to be in position for die-forming the element blank. In this die block 10, there is provided a recess 12 for forming in cooperation with a reciprocable forming punch 14 mounted directly above the slide in an opening 15 in the guide block 8, an interlocking projection and recess on the head of the fastener element blank in a manner well known to those skilled in the art so as to provide a completed fastener element E.

Forwardly of the recess 12 in the die block 10, there is arranged integral therewith a pair of upwardly extending portions 16 having angularly arranged inner face portions 17, and which are separated from one another by a vertically extending slot 19 arranged in the extreme end of the die block 10. The upper ends of the extending portions 16 are substantially flush with the under side of the upper block 8. When a blank B is positioned in the die block 10, it will be seen that the ends of the leg portions L of the blank about the angular face portions 17 of the extending portions 16, as shown clearly in Figs. 7 through 12 of the drawings.

There is positioned above the slide 4 in an opening 20 in the guide block 8 forwardly of the punch 14 and parallel thereto, a reciprocable finger-like member 21 having preferably a rounded inner edge, as at 22. This member 21 is adapted to move with the punch 14 and is adapted to move into the slot 19 in the die block 10 between the extending portions 16 and the legs L of the blank. In such position, it will be seen that the rounded inner surface 22 contacts the inner side of the head H of the blank, as well as the inner sides of the leg portions L thereof. By providing such an arrangement, it will be seen that the blank B is substantially surrounded during the punching operation, namely, by the cutting knife 9, the extending portions 16, and the fingerlike member 21 so as to confine the flow of the metal of the blank B during the forming of the interlocking projection and recess on the blank, which is one of the most important aspects of the invention. It will be seen that the extending portions 16 which abut the ends of the legs of the blank confine the flow of the metal into the legs thereby preventing elongation thereof thereby providing uniform legs of equal length, and that the finger-like member 21 confines the flow of the metal inwardly from the head of the blank.

Figures 9, 10:
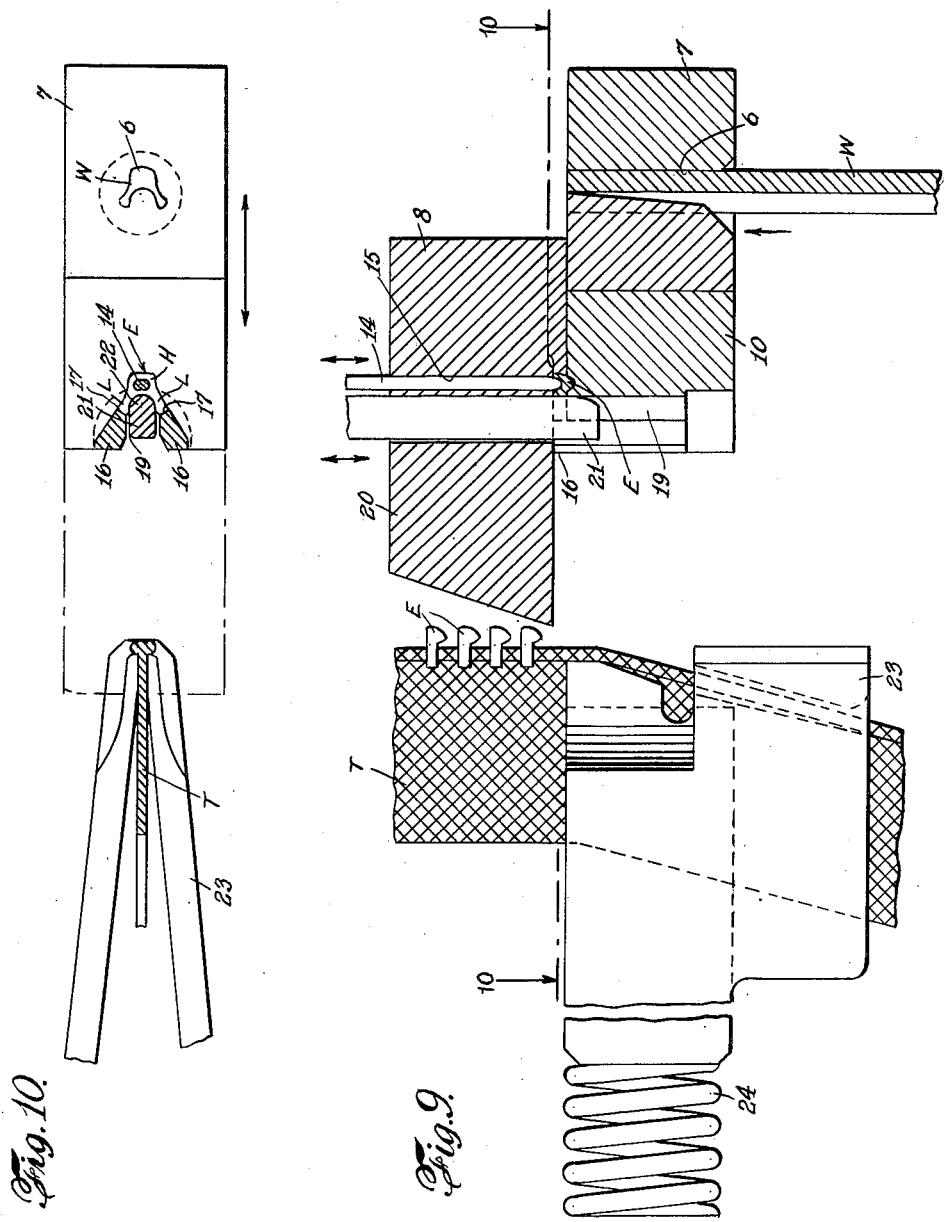
Fig. 9 illustrates in vertical section the forming of the fastener elements at the forming station with the slide and associated parts in same position as in Figs. 7 and 8.
Fig. 10 is a sectional view taken on line 10—10 of Fig. 9.

After the transfer slide 4 has moved to its fully retracted position and the blank has been formed into a completed fastener element E, as shown in Figs. 9 and 10, the slide 4 is moved forwardly or in the opposite direction so as to move the formed fastener element E carried thereby from the forming station to an attaching station. During such movement of the slide, as shown in Figs. 11 and 12 of the drawings, it will be seen that the formed fastener element E is under positive control at all times by the action of the extending portions 16 carried by the die 10 which abut the ends of the leg portions of the element, the recess or pocket 12 in the die, and the bottom side of the guide and hold-down plate or block 8. During further movement of the slide 4 toward its protracted or forward position, as shown in Figs. 13 and 14 of the drawings, the legs L or jaws of the fastener element are positioned astride the corded edge of a stringer tape T which passes through a tape guide 23 positioned opposite the end of the slide. The tape guide is constantly urged inwardly toward the end of the slide 4, preferably by means of a coil spring 24 arranged therewith so as to position and maintain the edge of the tape in the slot 19 in the end of the die block 10 snugly between the legs of the fastener element carried thereby.

There is arranged on the upper side of the transfer slide 4, a pair of side tools 25 and 26 for clamping the legs or jaws around the edge of the tape. One of these clamping tools is positioned to either side of the tape and is pivotally attached to the slide 4, as at 27 and 28. There is arranged with the side tools 25 and 26, segmental gears 29 and 30, respectively, which mesh with gear racks 31 and 32, respectively, fixedly arranged on the base of the machine to either side of the slide 4. Thus, it will be seen that when the slide 4 is reciprocated, the side tools 25 and 26 are actuated by the action of the segmental gears 29, 30 and the gear racks 31, 32. Accordingly, when the slide 4 is moved to its protracted position toward the tape, both of the side tools 25 and 26 will be moved inwardly into engagement with the legs or jaws of the fastener element bending them around into clamping engagement with the edge of the tape. During such clamping action of the side tools, it will be seen from Fig. 14 that the ends of the legs of the element are moved gradually out of contact with the angular face portions 17 of the extending portions 16 of the die 10 thereby tending to insure correct positioning of the element on the edge of the stringer when the clamping action is completed.

During the forward movement of the slide 4 and while the legs or jaws of the fastener element are being clamped around the edge of the stringer tape, the wire stock W is fed upwardly so that the extreme end of the wire is again positioned in the space between the upper side of the block 7 and the lower face of the block 8, as shown in Fig. 13.

In such position, the end of the wire is in position for the cutting of another fastener blank B from the end thereof for forming the next fastener element. The transfer slide 4, together with the end of the stock carried thereby, is moved to its retracted position away from the tape T and in so doing another blank B is cut from the end of the wire stock by the knife 9 as the end of the stock comes in contact therewith. The tape T is moved simultaneously upwardly so as to present an edge portion of the tape opposite the end of the slide for receiving the next fastener element. This completes the cycle of the movement of the slide, and the cycle is repeated for the cutting, die forming, and attaching of each fastener element to the tape.

Now the various mechanisms of the machine will be briefly described. The wire feed rollers 2 and 3 may be driven by any conventional mechanism. The wire is fed upwardly through a slotted opening 33 in the base 34 of the machine which may be positioned on a suitable pedestal or other supporting surface.

The top of the opening 6 in the knife die block 7 is shaped to conform to the cross section of the wire, i. e., substantially Y-shaped, so as to fit around and into the channel of the wire and the surface of this block is ground to a cutting edge. The cutting knife 9 is adapted to fit around the outside of the wire and is provided with a cutting edge at its lower inner side which cooperates with the cutting edge 7a of the knife block 7 to slice or cut a fastener element blank from the end of the wire.

When the fastener element blank B has been severed and positioned in the forming die 10 by the knife 9, as has been previously described, it will be seen that the forward side of the knife 9 acts in supporting the front wall of the head H of the blank during the die forming operation by the punch 14. The construction and timing of the slide 4 and the punch 9 are such that the head of the fastener element blank is disposed directly under the punch 14 when the slide is at its innermost or fully retracted position, when for the moment, there is no movement of the slide during the die-forming operation.

Figure 4:
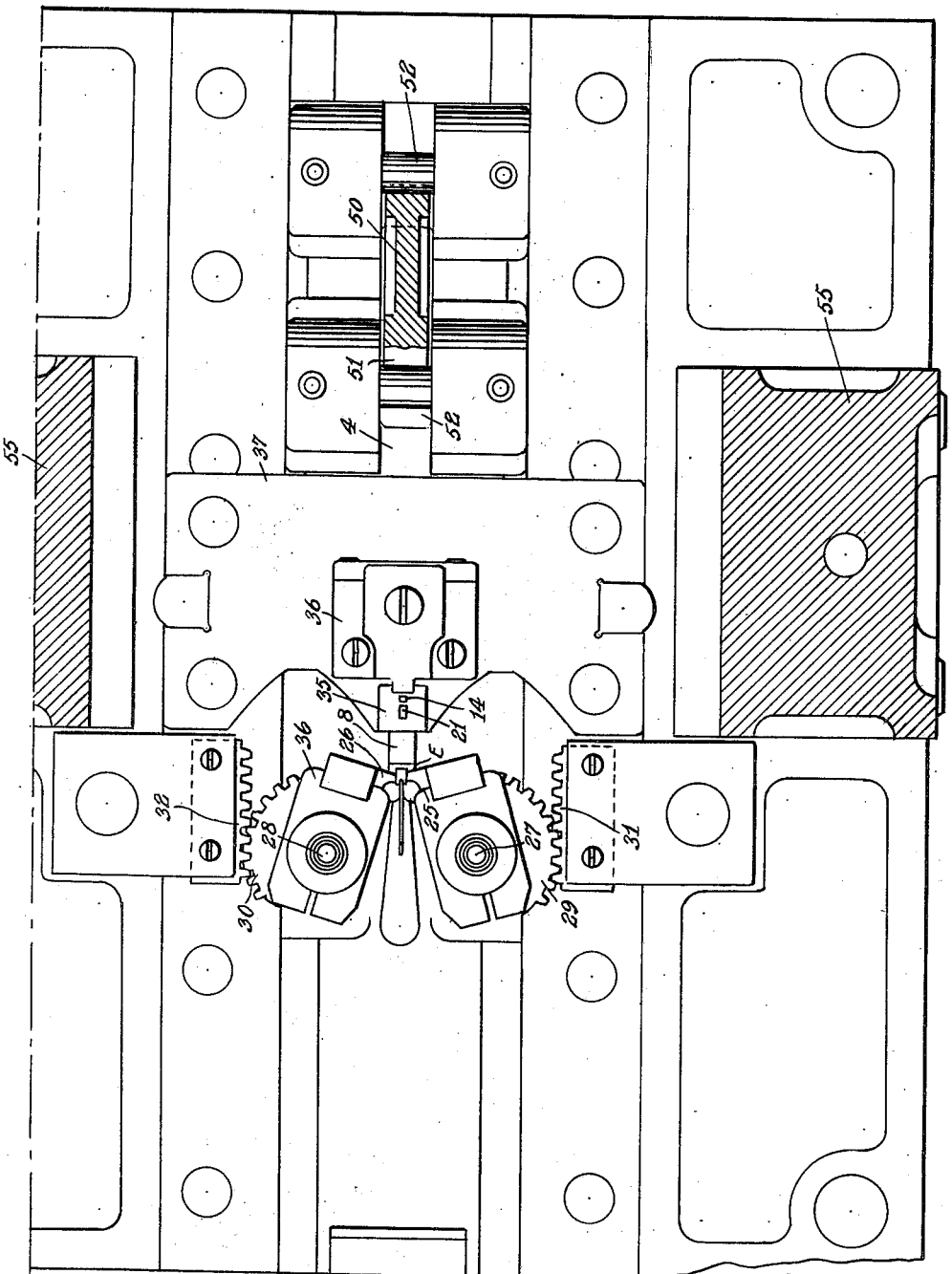
Fig. 4 is a horizontal cross section through the machine with some of the parts removed.

As clearly shown in Figs. 3 and 4 of the drawings, the punch 14 and the finger-like aligning member 21 are adjustably clamped in a movable holder or bracket 35 which is slidably arranged on a vertically extending post-like bracket member 36 having a base portion 37 which straddles the slide 4 and is secured on each side to the base 34 of the machine. There is arranged with the punch holder 35, a stop pin 38 the inner side of which cooperates with a recess 39 arranged in the side wall of the member 36 for limiting the upward movement of the bracket 35. A coil spring 40 is arranged between the lower side of the punch holder 35 and the base 37 of the bracket 36 which normally urges the punch holder upwardly.

Above the punch holder 35 and the bracket 36, there is arranged a movable head 41 which is slidably arranged on a plurality of vertically extending guide posts 42, four in the present instance, carried by the standard portions 55. There is carried by the head 41 forwardly thereof, a vertically extending plunger-like member 43 for actuating the punch holder 35 upon movement of the head. This member 43 is adjustably held in an aperture 44 of the head by means of an adjusting nut 45. The member 43 is adjusted and held in adjustment by means of a screw 46 and lock nut 47 carried by the head above the lock nut 45. On the rear side of the head 41, there is secured thereto by means of screws 48, a downwardly extending bracket-like member 49 in the form of a cam for actuating the slide 4 upon vertical movement of the head 41 to which it is attached. On the lower end of this member 49, there is arranged an angular camming portion 50 which extends through a slotted opening 51 in the rear end of the slide 4. To either end of the slot 51 there is arranged with the slide 4, a friction roller 52 which the sides of the member 49 contact when actuating the slide.

There is mounted in the head 41 adjacent the upper side thereof, a stud shaft 53 to which one end of a connecting rod 54 is rotatably secured. On the base 34 of the machine, there is arranged a pair of vertically extending standard portions 55 with one arranged to either side of the machine. Between these standards there is arranged in suitable bearings carried thereby, a horizontally extending drive shaft 56, preferably having a hand wheel 57 secured to one end thereof and a pulley or sprocket 58 arranged on the opposite end thereof. The sprocket or pulley 58 is connected to any suitable source of power, preferably to a motor (not shown) by a suitable chain or belt.

The tape guide and control mechanism will now be described. Referring more particularly to Figs. 2 and 3, as previously described, the tape T passes through a friction guide member 23 which is constantly urged to its innermost position by means of the spring 24.

The tape passes upwardly from the guide 23 between a pair of narrow rolls or drums 60 and 61 arranged on shafts 62 and 63, respectively, with the roll 60 having a groove 64 arranged around the periphery thereof for accommodating the corded edge of the tape and the fastener elements after they have been attached thereto. There is also arranged with the roll 60, a gear 65 which meshes with a gear 65a arranged with the roll 61. The roll 61 is a friction roll to hold the tape in contact with the driving roll 60. The shaft 62 upon which the roll 60 is mounted is arranged in suitable bearings carried by the bracket member 66, and the shaft 63 upon which the roll 61 is mounted is pivoted in a movable bracket member 76 which is pivotally attached to the bracket 66 by a pin 77 so that the roll 61 is movable away from and toward the roll 61 for the purpose of initially threading the tape into the machine. The roll 61 is held normally in contact with the roll 60, preferably by means of a coil spring 78. On the opposite end of shaft 62, there is arranged a ratchet wheel 67. Directly opposite the periphery of the wheel 67, there is mounted on the end of the bracket 66 a pawl 68 for driving the wheel and the drums 60 and 61 in a well-known manner.

There is also arranged in suitable bearings in the bracket 66, a shaft 69 on the outer end of which there is mounted a bell crank 70. The bell crank 70 is attached to the pawl 68 by means of a link member 71. On the opposite end of the shaft 69 on the inner side of the bracket 66, there is mounted on this shaft a suitable cam member 72. There is arranged on the outer side of the head 41, a bracket member 73 having an outwardly extending pin member 74 arranged therewith which cooperates with the cam member 72. Thus, it will be seen that when the head is actuated, it rotates the rolls or drums 60 and 61 through the action of the cam member 72, the shaft 69, the bell crank 70, the link 71, and the pawl and ratchet wheel 68 and 67, respectively. There is arranged below the ratchet wheel 67 preferably a locking pawl 75 so as to prevent any backlash in the ratchet wheel or any reverse movement thereof.

In Figs. 15 and 16 of the drawings, there is shown a modification of my invention. The operating mechanism for this construction is substantially the same as that shown and described for the preferred form, but the slide would be double-acting in that it would have a forming and attaching station at each end so as to make two fastener stringers. In this construction, there is provided a reciprocable slide member 100 having a forming die and punch 101 and 102, respectively, arranged in one end thereof, and a similar forming die and punch 103 and 104, respectively, arranged in the opposite end of the slide. There is also arranged in this slide member at one end thereof, an opening 105 up through which the wire W' passes, and there is provided above the slide at that end a cutting knife 106 which cuts the fastener blanks from the end of the wire upon movement of the slide in one direction in a manner as has been previously described. In the opposite end of the slide, there is arranged a similar opening 107 up through which which another wire W″ passes and a similar cutting knife 108 is arranged above the slide at that end for cutting fastener blanks from the end of this wire upon movement of the slide in the opposite direction.

Directly opposite the forming die 101 and that end of the slide, there is arranged a tape T′ which is positioned in a suitable guide 109, and directly opposite the forming die 103 in the opposite end of the slide there is arranged a tape T″ which is positioned in a suitable guide 110. Any suitable mechanism may be provided for actuating the slide and, in the present instance, a rotatable shaft 111 is provided having an eccentric 112 secured thereto which is positioned in an opening 113 arranged centrally of the slide so as to reciprocate the slide in a well-known manner. As in the preferred construction, there are provided side tools 114 and 115 adjacent each end of the slide which are actuated thereby upon movement thereof for clamping the fastener elements to the edges of the respective tapes T′ and T″.

Thus, it will be seen that when the slide 100 is moved in one direction or the right by the eccentric 112, as shown in Figs. 15 and 16, that a fastener element blank is cut from the end of the wire W′ by the cutting knife 106 and deposited in the forming die 101 where it is formed in cooperation with the punch 102 into a completed fastener element. When the slide 100 is moved in the opposite direction or to the left, a fastener element blank is cut from the end of the wire W″ by the cutting knife 108 and deposited in the forming die 103 in that end of the slide, and is formed into a completed fastener element in cooperation with the punch 104. When the slide approaches the end of its travel, it will be seen that the fastener element previously formed in the die 101 is positioned astride the tape T′ and the side tools 114 clamp the legs of the fastener element into engagement therewith. While this is being done, the fastener element in the die 103 is being formed, as above described, and when the slide is moved in the opposite direction again or to the right, the fastener element formed in the die 103 is clamped to the edge of the tape T″ by the side tools 115. In other words, when the slide is moved in either direction, a fastener element is being formed in the die in one end of the slide, and the fastener element previously formed in the die in the opposite end is being secured to the tape.

In Fig. 17 of the drawings, there is shown another modification of the present invention. In this construction, there is provided two slide members 200 and 201 with each having an attaching and forming station at each end thereof so as to manufacture four stringers at one time. As in the modification previously described, there is provided a forming die and punch 202 and 203, respectively, at one end of the slide 200, together with a cutting knife 204, side tools 205, a tape and tape guide 206, and at the opposite end of this slide there is arranged a similar forming die and punch 207 and 208, respectively, together with a cutting knife 209, side tools 210, and tape and tape guide 211.

Similar mechanism is arranged with the other slide 201, i. e., a forming die and punch 212 and 213, respectively, together with a cutting knife 214, side tools 215, and a tape and tape guide 216 at one end, and at the opposite end a similar forming die and punch 217 and 218, respectively, together with a cutting knife 219, side tools 220, and a tape and tape guide 221.

Any suitable means may be provided for reciprocating the slides and, in the present instance, there is shown an oscillating shaft 222 arranged between the slides 200 and 201 having a yoke member 223 secured thereto. There is arranged in one end of this yoke 222, an open-ended slot 224 in which a pin 225 carried by the slide 200 is positioned. In the opposite end of the yoke member 222, there is a similar open-ended slot 226 in which a pin 227 carried by the slide 201 is disposed.

Thus, it will be understood by providing such a construction that when the shaft 222 is rotated in one direction that a fastener element blank is cut and formed in one end of each of the slides 200 and 201, and that the fastener element previously formed in the opposite end of these slides during the previous cycle is simultaneously attached to the respective tapes positioned opposite those ends of the slide. When the shaft is rotated in the opposite direction, the fastener elements formed during the previous cycle in the opposite ends of each of the slides are attached to the respective stringers, and fastener elements are formed in the opposite ends of the slides at the same time.

It will be understood that the wire feeding, tape feeding, punch and guide and other operating mechanisms for both these modifications are substantially the same as those shown and described for the preferred embodiment.

As a result of my invention, it will be seen that there is provided a machine for manufacturing slide fasteners which is simple and inexpensive in its construction and operation, and a machine which can be operated by the most unskillful person. After the machine has been once set up, it needs no further attention or adjusting and it is foolproof. Also, it produces a uniform and superior product most efficiently as it operates at a reasonable high rate of speed with a minimum of down time. It contains a minimum number of parts which may, if necessary, be conveniently and inexpensively replaced thereby keeping maintenance costs to a minimum.

While I have shown and described an embodiment and several modifications thereof which my invention may assume in practice, it will be understood that this embodiment and the modifications thereof are merely for the purpose of illustration and description, and that other forms may be devised within the scope of my invention as defined in the appended claims.

What I claim as my invention is:

1. In a machine for making slide fastener stringers of the class described, a reciprocable transfer member, a forming die carried by said reciprocable member adjacent one end thereof, a forming punch arranged for reciprocable movement adjacent said reciprocable member and said die, means for feeding to and positioning a substantially Y-shaped fastener element blank in said forming die, said forming die and forming punch in cooperation with one another adapted to form said blank, the end of said reciprocable member having a slotted opening therein with the Y-shaped blank adapted to straddle said slotted opening, and means substantially surrounding the fastener element blank during the die forming thereof so as to confine the flow of material of said blank during the forming thereof, said means consisting of a stationary member arranged directly opposite said reciprocable member which abuts against the head portion of said blank, a pair of extending lug portions carried by the reciprocable member with one arranged to either side of the slotted opening therein which lug portions abut the ends of the leg portions of said blank, and a reciprocating member arranged opposite said reciprocable member adjacent said forming punch which abuts that portion of the blank between the leg portions thereof.

2. In a machine for making slide fastener stringers of the class described, a reciprocable slide having a slot therein at one end thereof, a forming die carried by said slide adjacent said slot, a stationary cutting tool arranged directly above said slide for cutting fastener element blanks successively from the end of a continuous length of stock, means for feeding a continuous length of wire stock through an opening in said slide cutting means carried by said slide for moving the end of said stock relative to said cutting tool and operating in conjunction therewith for cutting a fastener element blank from said end of the continuous stock upon movement of said slide and positioning it in said die, means arranged to either side of said slot operating in conjunction with said cutting tool for holding said blank in said die while it is being formed with the bifurcated end of said blank extending toward and straddling said slot so as to be in alignment therewith, a finger-like member mounted for movement transversely of said slide and adapted to move into the slot thereof against the bifurcated end of the fastener element blank so as to aid in confining the flow of the material of the blank during the die forming operation, means for feeding a flexible carrier transversely of said slide directly opposite said slot at one end of said slide, and means for guiding the flexible carrier into said slot whereby the fastener element will be positioned astride the edge of the carrier upon movement of said slide.

3. In a machine for making slide fastener stringers of the class described, a reciprocable slide, a forming die carried by said slide, a stationary cutting tool arranged directly above said slide at a forming station, means for feeding a continuous length of stock into said machine into the path of said slide from which fastener element blanks are successively cut, cutting means carried by said slide for moving the end of said stock relative to said cutting tool and operating in conjunction therewith to cut blanks from the end of said stock during the movement of said slide to its retracted position and to position said blanks in the said die, means operating in conjunction with said die at said forming station for die forming said blanks while in said die, means for moving said slide so as to transfer said blanks from said forming station to an attaching station in said machine, means for attaching said blanks to a flexible carrier at said attaching station when said slide is moved to its protracted position consisting of a pair of clamping tools with one arranged to each side of the flexible carrier, said clamping tools mounted for pivotal movement on said slide, a segmental gear arranged with each of said clamping tools, and a gear rack positioned to one side of each of said clamping tools with which said segmental gears co-operate to actuate said clamping tools upon movement of said slide.

4. In a machine for making slide fastener stringers of the class described, a reciprocable slide, a stationary cutting tool arranged directly opposite said slide, a forming die carried by said slide adjacent one end thereof, said slide having a hole extending therethrough at a spaced distance from said forming die, means for feeding a continuous length of wire stock into and through said hole with the end portion thereof disposed in said hole, cutting means carried by said slide adjacent said hole which co-operates with said first mentioned cutting means to cut blanks from the end of said stock, means for actuating said slide whereby said slide, upon movement in one direction, moves the end of the wire stock against said first mentioned cutting tool so as to shear a fastener element blank from the end of said wire stock and upon continued movement thereof to position said blank in said forming die, a forming punch arranged adjacent said cutting tool which co-operates with said forming die to form said blank into a fastener element, means for feeding a flexible tape past the end of said slide, said slide upon movement in the opposite direction adapted to position said formed fastener element astride the edge of said tape, means for clamping the formed element to said tape consisting of a pair of clamping members pivotally mounted on said slide with one arranged to either side of said clamping members, a segmental gear arranged with each of said clamping members, and a stationary gear rack arranged to either side of said slide with which the respective segmental gears co-operate to actuate said clamping members upon movement of said slide.

References Cited in the file of this patent

UNITED STATES PATENTS

| | | |
|---|---|---|
| 1,467,015 | Sundback | Sept. 4, 1923 |
| 1,817,990 | Lamb | Aug. 11, 1931 |
| 2,141,200 | Sundback | Dec. 27, 1938 |